United States Patent [19]

Barnes

[11] 4,375,896

[45] Mar. 8, 1983

[54] SUSPENSION HANGER BRACKET

[75] Inventor: Lawrence G. Barnes, Troy, Mich.

[73] Assignee: Rockwell International Corporation, Pittsburgh, Pa.

[21] Appl. No.: 220,391

[22] Filed: Dec. 29, 1980

[51] Int. Cl.$^3$ .............................................. B60G 11/04
[52] U.S. Cl. ...................................... 280/718; 267/56
[58] Field of Search ............... 180/73 TL, 88; 267/52, 267/54, 56; 280/676, 718

[56] References Cited

U.S. PATENT DOCUMENTS

| | | | |
|---|---|---|---|
| 3,504,815 | 4/1970 | Bona | 280/676 |
| 3,844,579 | 10/1974 | Gunha | 280/718 |
| 3,918,736 | 11/1975 | Hickman | 280/676 |
| 4,033,609 | 7/1977 | Malcolm | 280/718 |
| 4,175,772 | 11/1979 | Lampert | 280/718 |

Primary Examiner—Richard A. Bertsch

[57] ABSTRACT

In an automotive axle of the type having a hanger bracket attached to the axle by horizontal welds, the hanger bracket is capable of receiving a suspension member therein, the improvement comprising: a fulcrum element on the hanger bracket; the fulcrum element interposed between the point where the load is imparted by the suspension member to the hanger bracket and the weld on the mounting flange of the hanger bracket, the fulcrum element capable of preventing load reversals from occurring in the welds thereby adversely affecting the fatigue life of the welds, the fulcrum element is at least one bolt in the hanger bracket, the bolt extending through the hanger bracket and into contact with the axle.

5 Claims, 2 Drawing Figures

SUSPENSION HANGER BRACKET

BACKGROUND OF THE INVENTION

1. Field of the Invention

This invention relates to a method of preventing load reversals in weld joints. Specifically, there is set forth a method for preventing the load reversals in a weld joint between a suspension hanger bracket and an automotive axle.

2. Description of the Prior Art

The current state of the art in mounting tandem drive axles to heavy trucks and other large on and off highway vehicles utilizes axles which incorporate suspension hanger brackets. The hanger bracket captures the suspension member used in the suspension system of the vehicle. The hanger brackets are typically welded to the drive axle housing intermediate its end and the differential case at its center. The typical axle of this type is shown in FIG. 1.

In normal operation, the suspension system of the vehicle imparts vertical and horizontal loads to each of the hanger brackets. It has been found that in order to meet design criteria, no failure of the hanger bracket weld by the impartation of one million load reversals, it was necessary to increase the amount of horizontal bracket weld (fillet size and length) or utilize the set screws of the present invention.

It has been found that with a normal hanger bracket design, a lateral load produces a highly stressed area around the bracket weld shown in FIG. 2 at X and Y. If the lateral load is reversed, the stress is reversed, producing alternate compressive and tensile stresses. This type of loading, reversing bending, it the most unfavorable for extended fatigue life.

By the use of the concept of the present invention, the stresses at points X and Y can be prevented from reversing thereby dramatically extending fatigue life and thus provide an alternate way of extending the fatigue life of the hanger bracket weld.

SUMMARY OF THE INVENTION

It is an object of this invention to provide a means for extending the fatigue life of the hanger bracket welds on heavy duty axles used in on and off highway automotive applications.

Another object of this invention is to provide a simple means of extending the fatigue life of the hanger bracket weld without modifying the weld size or bracket cross section.

It is a further object of this invention to extend the fatigue life of a hanger bracket weld between the hanger bracket and an automotive axle by inserting four set screws into each hanger bracket to act as a fulcrum between the load and the weld of the hanger bracket.

It is yet an additional object of this invention to provide a means for extending the fatigue life of a weld between a hanger bracket and an axle by preventing load reversals within the weld caused by cyclic applications of the load.

These and other objects of the invention are provided in a preferred embodiment thereof which includes an automotive axle of the type having a hanger bracket for receiving a suspension therein, the hanger bracket is attached to the axle by horizontal welds. The improvement to the axle hanger bracket arrangement is a fulcrum element interposed between the point where the load is imparted by the suspension member and the weld on the hanger bracket mounting flange. The fulcrum element prevents load reversals from occurring within the weld. The load reversals adversely affect the fatigue life of the welds between the hanger bracket and the axles.

These and other objects of the present invention will become apparent to those skilled in the art by reading the following specification, reference being made to the accompanying drawings and the appended claims.

DESCRIPTION OF THE PREFERRED EMBODIMENT

Figure 1:
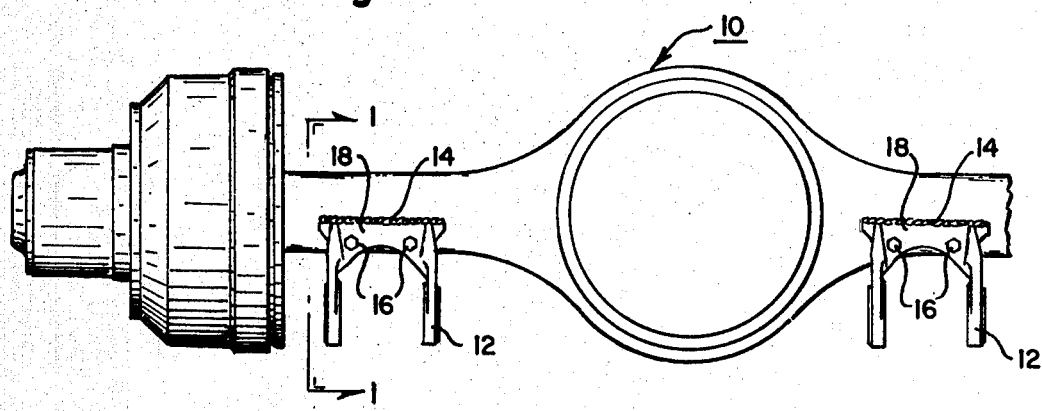
FIG. 1 is a typical axle showing the hanger brackets welded to the underside thereof.
Figure 2:
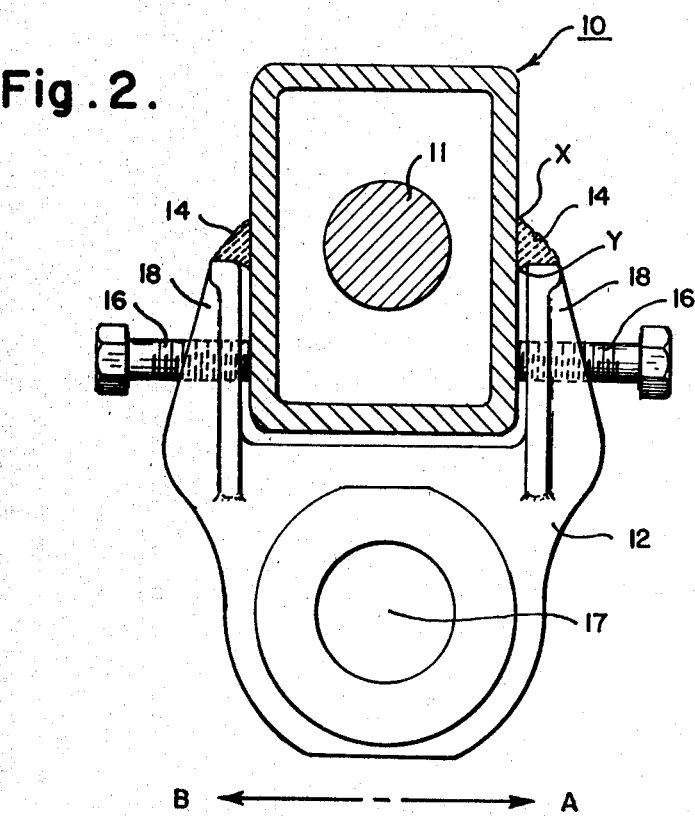
FIG. 2 is a sectional view of the axle along lines 1—1.

FIGS. 1 and 2 show an axle generally denoted as 10 including a drive shaft 11 with a hanger bracket 12 welded to the underside thereof. The hanger bracket captures the suspension member, not shown, and is consequently subjected to forces, both horizontally and vertically, as the vehicle to which the axle is mounted traverses the ground. These forces, especially in the horizontal direction, cause stress reversals in the weld 14 which join the hanger bracket 12 to the axle 10.

As can be seen in FIG. 2, the hanger bracket of the present invention is welded to the axle 10 by two welds on both sides thereof. As can be seen in FIG. 2, there is included within each side of the hanger bracket two bolts, or set screws 16, which are threaded into the mounting flange bracket 18 of the hanger bracket 12 and impinge on the wall of the axle 10.

The function of the bolts or set screws 16 is to prevent stress reversals from occuring in the weld 14. With reference to FIG. 2, it can be recognized that with the prior art hanger bracket design (one without the bolts) the lateral load of direction A/B applied at point 17 produces a highly stressed area around a bracket weld at points X and Y. If the lateral load is reversed, say from direction B to direction A, then the stresses are reversed. This type of loading, reverse bending, is the most unfavorable for extended fatigue life. By interposing the fulcrum, in the form of bolts 16, between the weld and the load acting on the housing leg 18, reversals of stresses at points X and Y can be prevented from occurring. The elimination of stress reversals within the weld dramatically extends the fatigue life of the weld 14. For example, when the load is applied in direction A, area Y is stressed in tension and area X is stressed in compression. When the load reverses toward direction B, bolt 16 acts as a fulcrum placing Y in tension and X in compression preventing the reversal of stresses.

Various tests of the axle hanger bracket weld were performed with and without the addition of bolts or set screws 16. The results of this testing were that the prior art hanger bracket weld failed from fatigue at approximately 100,000 cycles. The same weld with the inclusion of the bolts 16 was tested to one million cycles (the design objective) without failure. In the experimental axle, a $\frac{3}{8}$" set screw in the mounting flange was adequate to prevent the stresses in the welds 14 from reversing.

It is imperative that the bolts or set screws 16 are fixedly fastened to the hanger bracket and be capable of moving therewith to insure that forces acting in the bracket are transferred into the axle by the fulcrum element or bolt 16. In a preferred embodiment, the fulcrum element is screwed into a tapped hole in the hanger bracket 12 and when welded into place. This insures that the fulcrum element 16 moves with the hanger bracket as it is loaded in either the A or B direction.

In the preferred embodiment, a bolt or set screw is used for the fulcrum element but it can be seen that any element which can impinge or contact axle 10 and can be held fast to the hanger bracket may be utilized. This can include an element integrally formed on the inside of the hanger bracket.

The location of the fulcrum element with respect to the weld 14 and the load point must be such that the stresses at X and Y are prevented from reversing. This can be accomplished by locating the fulcrum element at any point between the weld and the load application point on hanger bracket 12. Obviously, the fulcrum element must be placed through the mounting flange in an area where it can contact the outer wall of the axle.

In a typical embodiment, the hanger bracket is nine inches long with two set screws inserted on seven inch centers. The hanger bracket is approximately an $1\frac{1}{2}''$ thick at the point where the set screws are threaded into and through the hanger bracket. In this configuration, a $\frac{7}{8}''$ diameter set screw is utilized for the fulcrum element described above. After installation, each set screw is torqued to between 180 and 230 foot pounds. The set screw is then tack welded in position so as to maintain permanet contact with the axle housing. A typical distance between the axle outer surface and the inner surface of the hanger bracket is 2/10''. This distance allows the fulcrum element to operate independent of any other contact between the axle housing and the walls of the hanger bracket. In this typical configuration, the weld between the hanger bracket and the axle housing has a fillet size of $\frac{5}{8}'' \times \frac{3}{4}''$. The distance between the load application point and the point where the set screw is inserted is approximately 6''. The distance from the load application point to the beginning of the weld is approximately 7''. It can be seen that fewer or more set screws could be utilized if the bracket width varies from the approximately 9'' used in the preferred embodiment.

While only one example of the present invention has been described, it should be understood by those skilled in the art of welding brackets to axles that other forms may be added without departing from the spirit of the invention or the scope of the appended claims. Therefore, without limitation to this respect, the invention is defined in the following claims.

I claim:

1. In an automotive axle of the type having a hanger bracket attached to said axle by horizontal welds, said hanger bracket is capable of receiving a suspension member therein, the improvement comprising: a fulcrum element on said hanger bracket; said fulcrum element interposed between the point where the load is imparted by said suspension member to said hanger bracket and said weld on the mounting flange of said hanger bracket, said fulcrum element capable of preventing load reversals from occurring in said welds thereby adversely affecting the fatigue life of said welds, said fulcrum element is at least one bolt in said hanger bracket, said bolt extending through said hanger bracket and into contact with said axle.

2. A method for preventing stress reversals from occurring in weld joints between a first member and a second member wherein said second member is cyclically loaded by forces perpendicular to said welds first in one direction then in opposite directions, said forces applied to said second member a predetermined distance from said weld joints, said method comprising the steps of: inserting a fulcrum element through said second member and into contact with said first member when said weld joint is in an unstressed condition; and locking said fulcrum element onto said second member for movement therewith.

3. A method as set forth in claim 2 wherein said step of inserting said fulcrum element through said second member takes place at a point on said second member between the weld and the point of application of said cyclic force.

4. A method as set forth in claim 2 wherein the step of locking said fulcrum element to said second member and in contact with said first member is accomplished by welding said fulcrum element to said hanger bracket.

5. A method as set forth in claim 2 wherein said first member is an automotive axle and the second member is a hanger bracket capable of supporting a suspension member which transmits said forces to said hanger bracket.

* * * * *